United States Patent Office 2,994,443
Patented Aug. 1, 1961

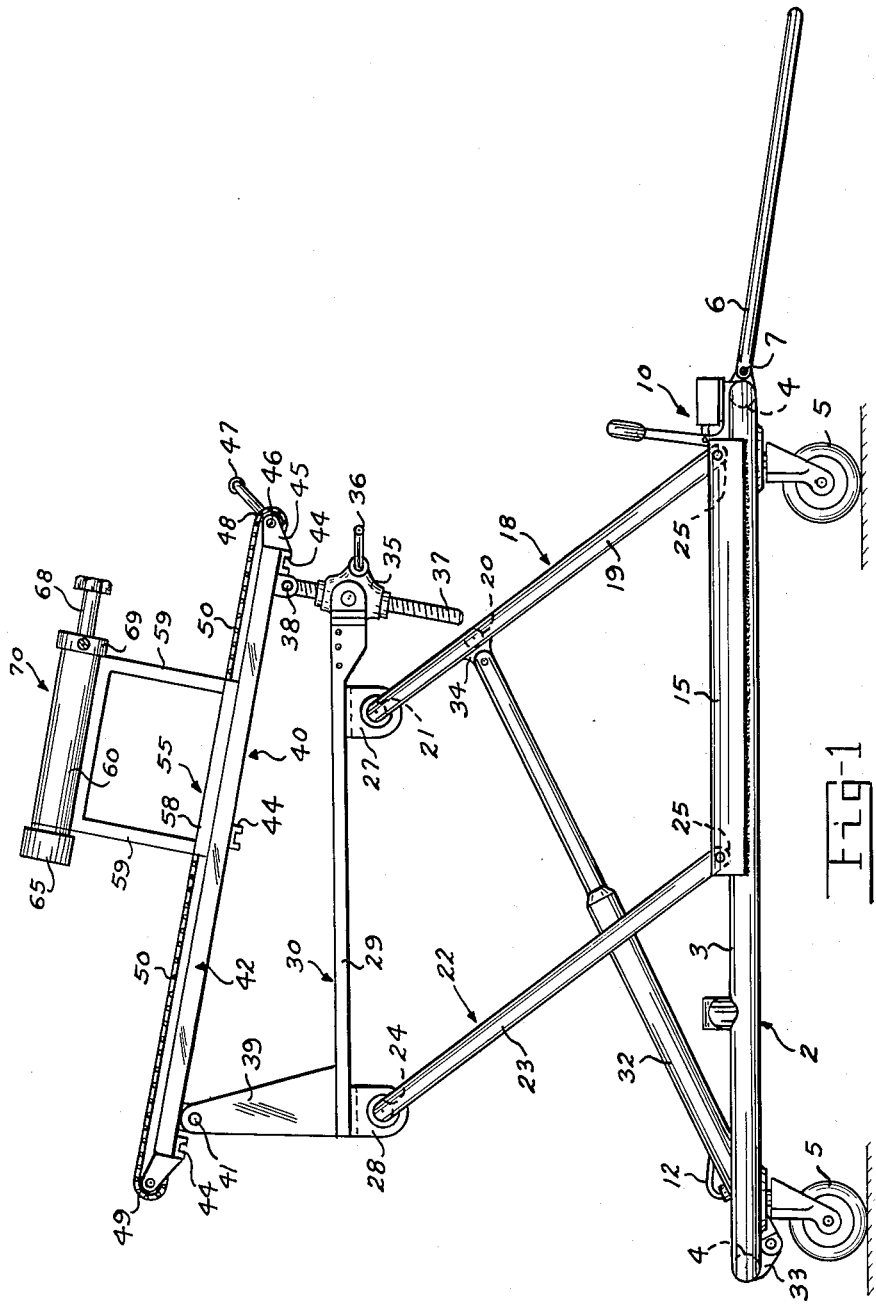

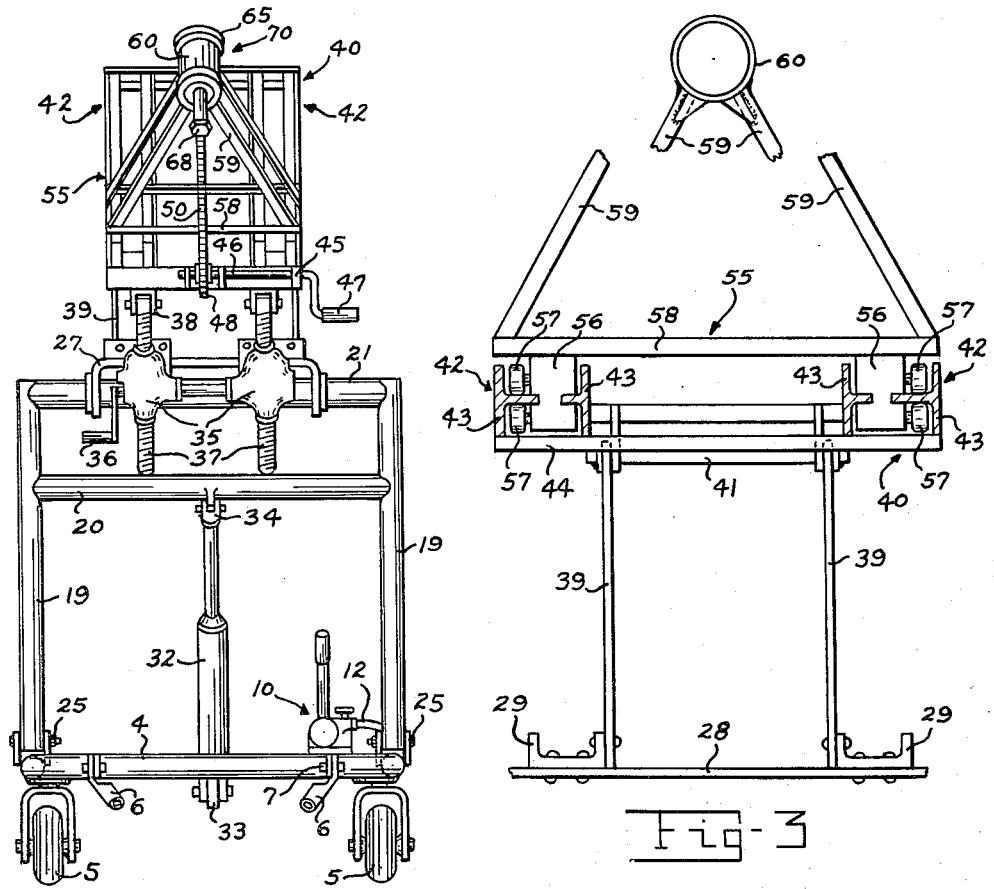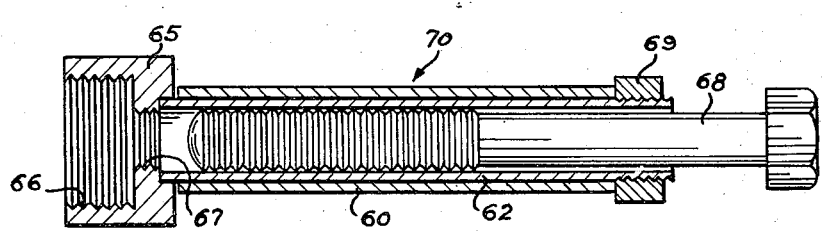

2,994,443
EQUIPMENT FOR REMOVING ENGINE TURBINE ROTORS WHILE INSTALLED IN AIRCRAFT
Julian E. Gordon, 2638 Compton Ave., Orlando, Fla.
Filed Sept. 15, 1958, Ser. No. 761,269
4 Claims. (Cl. 214—1)
(Granted under Title 35, U.S. Code (1952), sec. 266)

The invention described herein may be manufactured and used by or for the United States Government for governmental purposes without payment to me of any royalty thereon.

The subject invention relates to a device for removing a turbine wheel and shaft from a jet engine while installed in an aircraft.

In the routine maintenance of jet engined aircraft it is necessary to remove the turbine wheel from each engine at regular periods of time to inspect the turbine blading. It is desirable to perform this inspection with the engines installed in the aircraft so that it is only necessary to dismantle the rear cowling and the engine tailpipe and afterburner sections. It has been very time consuming and difficult to remove the turbine wheel and shaft due to the small clearance of the turbine blades with the turbine housing and the difficulty of supporting the turbine wheel and its shaft while axially removing the same from the engine casing.

In accordance with the present invention a wheel pulling device is provided which can be rigidly coupled to the turbine wheel and effective to break the turbine and shaft from its splined connection with the compressor shaft and thereafter to support the turbine wheel and shaft while it is being removed from the engine casing. The turbine wheel puller is mounted on a carriage which is roller supported on a frame for free fore and aft movement. By means of a chain drive the carriage can be moved manually. The frame in turn is supported from a portable wheeled vehicle by a means providing for raising and lowering the frame a desired amount and means are also provided for tilting the frame in elevation. It is thus possible to bring the assembly adjacent the jet engines of a parked aircraft and to exactly align the puller with the axis of the turbine and shaft. When the turbine wheel puller has broken loose the connection between the turbine and compressor shafts, the carriage can be manually retracted until the turbine wheel and shaft are free of the engine casing. The turbine wheel and shaft may be lowered for inspection and by a reverse process reinstalled in the engine.

The specific features of the invention will become apparent by reference to the detailed description hereinafter given and to the appended drawings in which:

FIG. 1 is a side elevation view illustrating the invention;
FIG. 2 is an end view of the device of FIG. 1;
FIG. 3 is a view partly in section illustrating carriage mounting details; and
FIG. 4 is a view partly in section illustrating details of the turbine wheel puller elements.

Referring now to FIG. 1, the reference numeral 2 generally indicates a portable wheeled vehicle or base frame which comprises a rectangular frame having tubular side rails 3 and end cross rails 4 which are welded at the corners to form the frame. The frame 2 is portably supported on the ground by four castered wheels 5 mounted adjacent the corners of frame 2 and adapted to be manually moved or towed by a yoke 6, pivotally connected at its inner ends as at 7 to the frame 2.

The frame 2 being hollow can be partially filled with lead and one of the side rails 3 is internally blocked adjacent its ends to form a hydraulic fluid reservoir not shown, which is connected to the inlet of a conventional hand operated pump 10 provided with a conventional hand operated two way valve (not shown) whereby fluid may be pumped under pressure to a high pressure conduit 12 or returned from said conduit to the reservoir. The function of pump 10 and pressure conduit 12 will be later explained.

A pair of plates 15 are welded to each side of the side rails 3 and serve as clevis fittings for the frames 18 and 22, the legs of which are pivoted to the plates 15 by bolts 25. The frame 18 includes parallel tubular legs 19 joined by a tubular intermediate cross member 20 and a similar top cross member 21. The frame 22 includes the parallel tubular legs 23 joined at the top by a tubular cross member 24.

An inverted U-shaped clip 27 is journalled on the cross member 21 of the frame 18 and a similar U-shaped clip 28 is journalled on the cross member 24 of the frame 22. The clips 27 and 28 are joined by a pair of parallel laterally spaced channel members 29 riveted or welded thereto to compositely form a second frame generally indicated by the reference numeral 30. The frames 18 and 22 in effect form a parallel linkage interconnecting the base farme 2 and the frame 30 whereby the frame 30 will be maintained parallel to the base frame 2 as the frame 30 is raised or lowered through the linkage.

A hydraulic jack strut 32 is pivotally connected at its lower end to a lug 33 welded to the rear cross tube 4 of the base frame 2 and similarly pivoted to a lug 34 welded to the intermediate cross member 20 of the frame 18. The hydraulic jack strut 32 is connected to the end of the high pressure conduit 12 (FIG. 1) and is thus in comunication with the pump 10. Admission of pressure fluid to the jack strut 32 causes it to extend and produces rotation of the frames 18 and 22 about their pivots 25 and elevates the frame 30 relative to the base frame 2, while draining of fluid from the strut 32 through the control valve (not shown) at the pump 10, allows the frame 30 to be lowered.

The frame 30 has secured thereto at its forward end a pair of modified screw type actuators 35 conventional on aircraft and modified by interconnecting the normal power driving shafts and arranging for one of the shafts to be actuated by a hand crank 36. The parallel jack screws 37 which are raised or lowered by actuation of the hand crank 36 are each pivotally connected at their upper ends as at 38 to a third horizontal frame generally indicated by the reference numeral 40. At its other or rear end the frame 30 is provided with a pair of laterally spaced upstanding plates or standards 39 which are provided at their upper ends with pivot connections 41 to the rear end of the frame 40 and permit the frame 40 to be tilted in elevation when jack screws 37 are extended or retracted.

The frame 40, see FIGS. 1 and 3, consists of side members generally designated 42, each consisting of a pair of T-shaped members 43 placed in opposed spaced relation to form a guideway or track. The side members are secured to a number of channel shaped cross members 44 to form a rigid frame. At one end brackets 45 are secured to frame 40 and serve to rotatably journal a shaft 46 having a hand crank 47 at one end for manually rotating the shaft 46. A chain sprocket 48 is fastened on shaft 46 and a similar idler sprocket 49 is rotatably journalled at the opposite end of frame 40. A chain 50 is looped over the sprockets 48 and 49 and has its ends secured to a carriage generally indicated at 55 and adapted to shift the carriage 55 axially along the guideways formed by members 43 whenever the hand crank 47 is turned.

The carriage 55, see FIG. 3, consists of a pair of spaced longitudinally extending I shaped members 56 which form slides mating with the spaced T members 43 of the frame 40 and ball bearing rollers 57 engage the members 43 to further guide the carriage 55. The longitudinal members 56 are in turn secured to a rectangular frame 58 to which vertical members 59 are welded and which in turn are welded to a central sleeve or bushing 60.

The sleeve 60, see FIG. 4, serves to rotatably journal a hollow spindle 62 which is provided at one end with a counterbored head member 65 which is internally threaded as at 66 so as to fit the threads on the hub of the jet engine turbine with which the assembly is to be used. The head 65 is further threaded as at 67 to receive a threaded bolt or rod 68 extending therethrough and adapted to be turned by a wrench. The spindle 62 is retained in the sleeve 60 by means of a collar 69. The spindle 62, enlarged internally threaded head 65 and the bolt 68 form a well-known type of wheel puller and generally indicated by the reference numeral 70.

In use it is assumed that the engine nacelle cowling on the aircraft has been removed and the engine tailpipe and afterburner sections removed to expose the rear face of the turbine. On the J35 and J47 jet engines the compressor drive shaft is hollow and at its end is internally splined to mate with the splined end on the hollow turbine shaft. A long bolt passes through the hollow turbine shaft and its threaded inner end is received into a central threaded aperture on the compressor shaft and a nut on the outer end of the long bolt retains the compressor and turbine shafts in assembled relation. The nut on the elongated bolt is removed for removal of the turbine but the bolt is left in place and serves as a reaction member in pulling the turbine wheel shaft axially from its splined connection with the compressor shaft.

The turbine wheel removing equipment in accordance with the invention is then wheeled in place and adjusted so that a vertical plane passing through the axis of the puller assembly lies in the plane of the turbine shaft. The hand operated hydraulic pump 10 is then actuated to elevate the frame 30 by means of hydraulic fluid under pressure entering the hydraulic jack strut 32 from conduit 12, fed by the pump 10. The jack strut rotates the frames 18 and 22 about their pivots and raises frame 30 in the manner previously described. The screw actuators 35 are then actuated by the hand crank 36 to tilt the frame 40 until it is parallel with the axis of the turbine wheel shaft. Further vertical adjustment may be made through actuation of pump 10 until the axis of the spindle 62 of the puller assembly 70 is in substantially exact alignment with the turbine wheel shaft. The carriage 55 is then moved forward by manually rotating the chain sprocket shaft 46 by hand crank 47. The head member 65 of the puller assembly 70, is then securely threaded onto the threaded hub extension of the turbine wheel. The bolt 68 is then screwed inward by application of a wrench and will engage the end of the long retaining bolt which passes through the hollow turbine shaft as previously explained and further feeding of the bolt 68 will cause a reverse movement of the spindle 62 and its head member 65 causing the splined joint of the turbine and compressor shafts to be broken. When the turbine wheel shaft is free the hand crank 47 is turned to cause the carriage 55 to move rearward and causing the turbine wheel, connected shaft and supporting bearings to be axially removed from the turbine without the turbine blades striking the engine housing since the turbine wheel remains firmly supported by the threaded connection of the head 65 with the threaded hub of the turbine wheel. When the turbine wheel and its connected shaft are clear of the engine housing, operation of the pump control valve will allow pressure fluid in the jack strut 32 to return to the reservoir and the frame 30 will be lowered until the turbine wheel can be visually inspected. If no repair work is required the turbine wheel and its shaft can be replaced in the engine by reversing the above procedure.

While the invention as described is particularly adapted to removal of the turbine wheels and shafts from J47 engines such as employed in the B47 airplane, it may be used without change on the J35 series of engines and the puller assembly may be readily modified to suit other jet engines without departing from the spirit of the invention as defined in the appended claims.

I claim:

1. A portable device for removing a jet engine turbine wheel and shaft from a jet engine while the engine is mounted on an aircraft comprising a portable wheeled base frame, a second frame positioned above and parallel to said base frame, means for maintaining a constant parallel relation between said second frame and said base frame, means for applying a lifting force to said second frame, a third frame positioned above and pivotally connected to said second frame, means mounted on said second frame for adjustably tilting said third frame along an inclined plane relative to said second frame and for maintaining the angle between said second frame and said third frame constant as said second frame is raised and lowered, a carriage, means for supporting said carriage on said third frame, means mounted on said third frame for axially shifting said carriage along said inclined plane, and means mounted on said carriage for pulling and supporting the turbine wheel and connected shaft.

2. A portable device for removing a jet engine turbine wheel and shaft from a jet engine while the engine is mounted on an aircraft comprising a portable wheeled base frame, a second frame positioned above and parallel to said base frame, means for maintaining a constant parallel relation between said second frame and said base frame, a fluid pressure actuated jack means interconnecting said base and second frames and adapted to raise and lower said second frame relative to said base frame, a third frame positioned above and pivotally connected to said second frame, mechanical means mounted on said second frame for adjustably tilting said third frame in elevation relative to said second frame and for maintaining the angle between said second frame and said third frame constant as the second frame is raised and lowered, said third frame including parallel longitudinally extending guide means, a carriage carried on said guide means and movable thereon, manual means mounted on said third frame for axially shifting said carriage on said guide means and a turbine wheel puller positioned on said carriage and adapted to be brought into engagement with the turbine wheel for axially removing the turbine wheel from the engine and supporting the turbine wheel during subsequent inspection.

3. A portable device for removing a jet engine turbine wheel and shaft from a jet engine while the engine is mounted on an aircraft comprising a portable wheeled base frame, a second frame positioned above and parallel to said base frame, a parallel linkage extending above said base frame and connecting said second frame to said base frame, a fluid pressure actuated jack means interconnecting said base and second frames and adapted to raise and lower said second frame relative to said base frame in parallel relation thereto, a third frame positioned above and pivotally connected to said second frame, a mechanical means mounted on said second frame for adjustably tilting said third frame in elevation relative to said second frame and for maintaining the angle between said second frame and said third frame constant as the second frame is raised and lowered, said third frame including parallel longitudinally extending guide means, a carriage carried on said guide means and movable thereon, means mounted on said third frame for axially shifting said carriage on said guide means and a turbine wheel puller positioned on said carriage and adapted to be brought into engagement with the turbine wheel for axially removing the turbine wheel from the engine and supporting the turbine wheel during subsequent inspection.

4. A portable device for removing a jet engine turbine wheel and shaft from a jet engine while the engine is mounted on an aircraft comprising a portable wheeled base frame, a second frame positioned above and parallel to said base frame, a parallel linkage extending above said base frame and connecting said second frame to said base frame, a fluid pressure actuated jack means interconnecting said base and second frames and adapted to raise and lower said second frame relative to said base frame in parallel relation thereto, a third frame positioned above and pivotally connected to said second frame at one end thereof, mechanical means mounted at the other end of said second frame between said second frame and said third frame for tilting said third frame in elevation relative to said second frame and for maintaining the angle between said second frame and said third frame constant as the second frame is raised and lowered, said third frame including parallel longitudinally extending guide means, a carriage carried on said guide means and movable thereon, manual means mounted on said third frame for axially shifting said carriage on said guide means and a turbine wheel puller positioned on said carriage and adapted to be brought into engagement with the turbine wheel for axially removing the turbine wheel from the engine and supporting the turbine wheel during subsequent inspection.

References Cited in the file of this patent

UNITED STATES PATENTS

| | | |
|---|---|---|
| 1,045,146 | Hunter | Nov. 26, 1912 |
| 1,950,544 | Driehaus | Mar. 13, 1934 |
| 2,395,411 | Kittel | Feb. 26, 1946 |
| 2,523,734 | Stephenson et al. | Sept. 26, 1950 |
| 2,583,114 | Monteith | Jan. 22, 1952 |
| 2,613,822 | Stanley | Oct. 14, 1952 |
| 2,712,874 | Murray | July 12, 1955 |
| 2,738,081 | Lee | Mar. 13, 1956 |
| 2,808,155 | Boggess | Oct. 1, 1957 |
| 2,828,870 | Corley | Apr. 1, 1958 |
| 2,867,334 | Aiken et al. | Jan. 6, 1959 |